United States Patent
Vladykin

(10) Patent No.: US 12,497,376 B2
(45) Date of Patent: Dec. 16, 2025

(54) COMPOUND [2-(DIMETHYLAMINO)-2-PHENYLBUTYL]-3,4,5-TRIMETHOXYBENZOATE 4-METHYL-2H-CHROMEN-2-ON-7-YL SULPHATE AND USE THEREOF

(71) Applicant: LTD "VALENTA—INTELLEKT", Moscow (RU)

(72) Inventor: Aleksandr Lvovich Vladykin, Moscow (RU)

(73) Assignee: LTD "VALENTA—INTELLEKT", Moscow (RU)

( * ) Notice: Subject to any disclaimer, the term of this patent is extended or adjusted under 35 U.S.C. 154(b) by 509 days.

(21) Appl. No.: 17/996,892

(22) PCT Filed: Apr. 26, 2021

(86) PCT No.: PCT/RU2021/050109
§ 371 (c)(1),
(2) Date: Oct. 21, 2022

(87) PCT Pub. No.: WO2021/221544
PCT Pub. Date: Nov. 4, 2021

(65) Prior Publication Data
US 2023/0159481 A1 May 25, 2023

(30) Foreign Application Priority Data

Apr. 27, 2020 (RU) .......................... RU2020114906

(51) Int. Cl.
*C07D 311/16* (2006.01)
*A61P 1/00* (2006.01)
*A61P 29/00* (2006.01)
*C07C 219/14* (2006.01)

(52) U.S. Cl.
CPC .............. *C07D 311/16* (2013.01); *A61P 1/00* (2018.01); *A61P 29/00* (2018.01); *C07C 219/14* (2013.01)

(58) Field of Classification Search
CPC .......... C07D 311/16; A61P 1/00; A61P 29/00; A61P 1/06; A61P 1/08; A61P 1/12; A61P 1/16; A61P 1/18; C07C 219/14; C07C 219/22; A61K 31/24; A61K 31/37; A61K 31/35; A61K 31/352
See application file for complete search history.

(56) References Cited

U.S. PATENT DOCUMENTS

| | | | |
|---|---|---|---|
| 6,407,073 B1 | 6/2002 | Trkovnik et al. | |
| 6,921,776 B1 | 7/2005 | Reed et al. | |
| 8,748,489 B2 | 6/2014 | Esquea et al. | |
| 2008/0038336 A1 | 2/2008 | Esquea et al. | |

FOREIGN PATENT DOCUMENTS

| | | |
|---|---|---|
| AU | 731887 B2 | 1/1999 |
| CA | 2653869 A1 | 12/2007 |
| EP | 1110549 A1 | 6/2001 |
| GB | 1434826 | 5/1976 |
| GB | 1434826 A | 5/1976 |
| JP | S50142533 | 4/1977 |
| JP | 2000504717 A | 4/2000 |
| JP | 2009539777 A | 11/2009 |
| RU | 2014138619 A | 5/2016 |
| RU | 2706166 C2 | 11/2019 |
| WO | 2007140611 A1 | 12/2007 |
| WO | 2013134869 A1 | 9/2013 |
| ZA | 202211777 | 6/2023 |

OTHER PUBLICATIONS

International Search Report for International Application No. PCT/RU2021/050109 mailed Nov. 4, 2021.
Written Opinion for International Application No. PCT/RU2021/050109 mailed Nov. 4, 2021.
Nagasaki, M.; Komori, S.; Ohashi, H. Effect of trimebutine on voltage-activated calcium current in rabbit ileal smooth muscle cells. Br. J. Pharmacol. 1993, 110, 399.
Fukuda, T.; Ohta, T.; Saeki, S.; Iwao, M. Divergent synthesis of lamellarin α 13-sulfate, 20-sulfate, and 13,20-disulfate. Heterocycles 2010, 80, 841.
Berge S.M., Bighley L.D., Monkhouse D.C.: "Pharmaceutical Salts" // Journal of Pharmaceutical Sciences, V. 66, # 1, 1977, pp. 1-19.
De Araujo AD et al. Selenoether oxytocin analogues have analgesic properties in a mouse model of chronic abdominal pain // Nature Communications, 2014, 5, 3165.
Hiroshi et al. Biliary spasmolytic action of 3-(2,4,5-trieyjoxybenzoyl)propionic acid (aa-149) in dogs, Europ. J. of Pharm., 1978, v.48, pp. 309-317.
Satoh H. et al., Relaxing action of trepibutone (AA-149), Japan. J. Pharmacol., 1981, v.31, pp. 587-592.

(Continued)

*Primary Examiner* — Rayna Rodriguez
(74) *Attorney, Agent, or Firm* — Perilla Knox & Hildebrandt LLP; Stephanie Davy-Jow; Kenneth A. Knox

(57) ABSTRACT

The invention relates to the field of organic chemistry and pharmacy and provides a novel compound [2-(dimethylamino)-2-phenylbutyl]-3,4,5-trimethoxybenzoate 4-methyl-2H-chromen-2-on-7-yl sulphate, a method for treating and preventing functional gastrointestinal disorders, which comprises administering an effective amount of compound [2-(dimethylamino)-2-phenylbutyl]-3,4,5-trimethoxy benzoate 4-methyl-2H-chromen-2-on-7-yl sulphate to a patient in need thereof, a pharmaceutical composition based on compound [2-(dimethylamino)-2-phenylbutyl]-3,4,5-trimethoxybenzoate 4-methyl-2H-chromen-2-on-7-yl sulphate, a drug comprising compound [2-(dimethylamino)-2-phenylbutyl]-3,4,5-trimethoxybenzoate 4-methyl-2H-chromen-2-on-7-yl sulphate, and a finished dosage form comprising compound [L-(dimethylamino)-2-phenybutyl]-3,4,5 -trimethoxybenzoate 4-methyl-2H-chromen-2-on-7-yl sulphate. The invention further relates to the use of compound [2-(dimethylamino) phenylbutyl]-3,4,5-trimethoxy benzoate 4-methyl-2H-chromen-2-on-7-yl sulphate for treating and preventing functional gastrointestinal disorders.

16 Claims, No Drawings

(56) References Cited

OTHER PUBLICATIONS

Brazilian Search Report for BR112022021166-0 mailed Jan. 25, 2024.
Chilean Office Action for Application No. 202202875 mailed Feb. 14, 2024.
Chilean Search Report for Application No. 202202875 mailed Feb. 14, 2024.
Chinese Office Action for Application No. 2021800302847 mailed Dec. 12, 2023.
European Search Report for Application No. 21796167.1 mailed Apr. 18, 2024.
Indian First Office Action for Application No. 202217065993 mailed Aug. 27, 2024.
Indonesian Office Action for Application No. P00202213304 mailed May 2, 2025.
Japanese Office Action for Application No. 2022-566106 mailed Oct. 17, 2023.
Maroccan Search Report for Application No. 58327 mailed Mar. 7, 2023.
Russian Office Action for Application No. 2020114906 mailed Sep. 21, 2020.
Russian Search Report for Application No. 2020114906 mailed Sep. 14, 2020.
Saudi Arabian First Office Action for Application No. 522441056.
Saudi Arabian Second Office Action for Application No. 522441056.
United Arab Emirates Search Report and Office Action Summary for P6002162/22 mailed Apr. 25, 2024.
Vietnamese Office Action for Application No. 1-2022-07655 mailed Dec. 9, 2024.

COMPOUND [2-(DIMETHYLAMINO)-2-PHENYLBUTYL]-3,4,5-TRIMETHOXYBENZOATE 4-METHYL-2H-CHROMEN-2-ON-7-YL SULPHATE AND USE THEREOF

CROSS-REFERENCE TO RELATED APPLICATIONS

This application is a national phase application under 35 U.S.C. 371 of International Application No. PCT/RU2021/050109 filed Apr. 26, 2021, entitled "NOVEL COMPOUND [2-(DIMETHYLAMINO)-2-PHENYLBUTYL]-3,4,5-TRIMETHOXYBENZOATE 4-METHYL-2H-CHROMEN-2-ON-7-YL SULPHATE AND USE THEREOF," which claims the benefit of and priority to Russian Patent Application No. 2020114906 filed Apr. 27, 2020, the contents of both of which being incorporated by reference in their entireties herein.

TECHNICAL FIELD

The disclosure relates to the field of organic chemistry and pharmacy and provides a novel compound [2-(dimethylamino)-2-phenylbutyl]-3,4,5-trimethoxybenzoate 4-methyl-2H-chromen-2-on-7-yl sulphate. This compound exhibits improved pharmacological activity toward functional gastrointestinal disorders.

BACKGROUND

A significant portion of diseases in the clinical practice of a therapist, a general practitioner and a gastroenterologist is functional gastrointestinal disorders. Functional bowel disorders (FBD) include a group of heterogeneous clinical conditions that are manifested through symptoms in the midgut and the hindgut and are not accompanied by any structural, systemic or metabolic changes. In spite of the absence of an organic base, functional diseases make life quality of patients poorer and cause a great economic damage to the society both by direct indices of expenditures for medical care and treatment and by indirect indices including compensation for temporary disability.

Starting from 1969, [2-(dimethylamino)-2-phenylbutyl]-3,4,5-trimethoxybenzoate is used for treatment of functional bowel disorders, mainly in cases of the irritable bowel disorder (IBS), in many countries. Efficacy of [2-(dimethylamino)-2-phenylbutyl]-3,4,5-trimethoxybenzoate used for alleviating abdominal pains was demonstrated in various clinical studies. For a long time, it was supposed that the influence of [2-(dimethylamino)-2-phenylbutyl]-3,4,5-trimethoxybenzoate was associated with its spasmolytic activity and that this preparation acts similarly to mebeverine which is a myotropic antispasmodic. However, later new data was found that related to the [2-(dimethylamino)-2-phenylbutyl]-3,4,5-trimethoxybenzoate mechanism of action and was not typical of antispasmodic drugs. Experimental and clinical studies show that the modulating influence of [2-(dimethylamino)-2-phenylbutyl]-3,4,5-trimethoxybenzoate exerted on the motor function of the gastrointestinal tract (GIT) manifests itself in normalizing hypo- and hyperkinetic disorders of the gastrointestinal motility in therapeutic and surgical pathologies. [2-(dimethylamino)-2-phenylbutyl]-3,4,5-trimethoxybenzoate provides a significant analgesic action. It is found in experimental studies that [2-(dimethylamino)-2-phenylbutyl]-3,4,5-trimethoxybenzoate is an agonist of opiate receptors and that its modulating influence on the gastrointestinal motility and its analgesic effect can be also determined through this mechanism of action. It regulates peristalsis along the entire length of the GIT by acting on the enkephalinergic system of the intestine.

By its structure, [2-(dimethylamino)-2-phenylbutyl]-3,4,5-trimethoxybenzoate is a tertiary aliphatic amine:

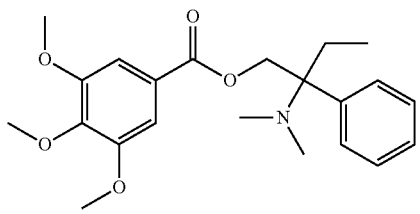 [SMILES: CCC(COC(=O)c1cc(OC)c(OC)c(OC)c1)(c1ccccc1)N(C)C]

Its distinguishing feature is an abnormally low, for a tertiary aliphatic amine, acidity constant value $pK_{BH+}=6.25$ [1]. In comparison, such widely used in organic synthesis bases as triethylamine and diisopropylethylamine, have the $pK_{BH+}$ values of 10.87 and 10.75, respectively. As a consequence of this feature, [2-(dimethylamino)-2-phenylbutyl]-3,4,5-trimethoxybenzoate does not form thermodynamically stable solid salts with many organic acids. Thus, it is known that acids, such as acetic acid and benzoic acid, do not form stable salts with [2-(dimethylamino)-2-phenylbutyl]-3,4,5-trimethoxybenzoate [2]. One of the many well-known dosage forms of [2-(dimethylamino)-2-phenylbutyl]-3,4,5-trimethoxybenzoate is its salt with maleic acid, namely [2-(dimethylamino)-2-phenylbutyl] -3,4,5-trimethoxybenzoate maleate.

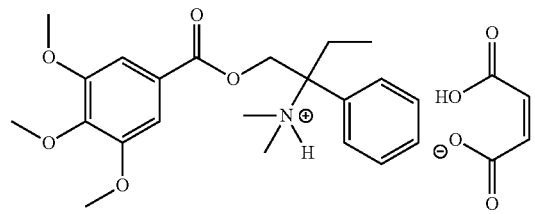 [SMILES: CCC(COC(=O)c1cc(OC)c(OC)c(OC)c1)(c1ccccc1)[NH+](C)C ; O=C([O-])/C=C\C(=O)O]

BRIEF SUMMARY

The inventors have produced a novel compound [2-(dimethylamino)-2-phenylbutyl]-3,4,5-trimethoxybenzoate 4-methyl-2H-chromen-2-on-7-yl sulphate with improved pharmacological activity.

This salt can be produced when [2-(dimethylamino)-2-phenylbutyl]-3,4,5-trimethoxybenzoate interacts with a corresponding aromatic sulfuric acid monoester.

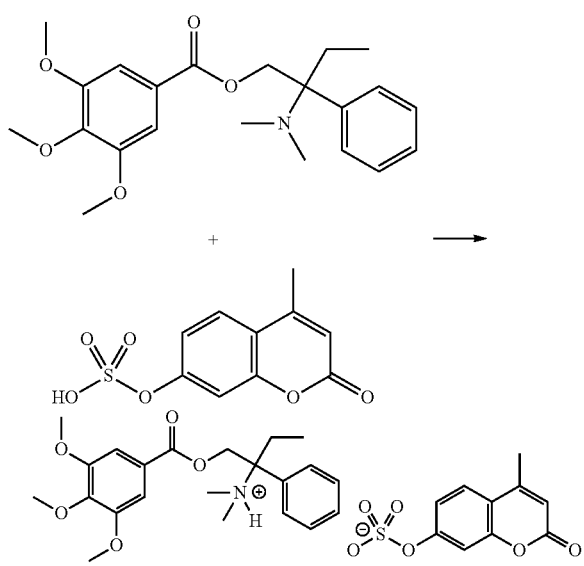

Thus, the technical effect of the proposed disclosure is production of a novel compound [2-(dimethylamino)-2-phenylbutyl]-3,4,5-trimethoxybenzoate 4-methyl-2H-chromen-2-on-7-yl sulphate with improved pharmacological activity.

To produce this compound, ion-exchange chromatography was used; which exemplary applications may be found in literature sources, including those relating to aryl sulfates [3].

Below, definitions of the terms used in this specification are presented.

"Medicinal agent" (drug substance, medicinal substance) means a physiologically active substance of synthetic or another (biotechnological, plant, animal, microbial, etc.) origin, which has a pharmaceutical activity and form the active base of a pharmaceutical composition used for production and making of a medicinal preparation (agent).

"Drug (preparation)" means a substance (or a mixture of substances in the form of a pharmaceutical composition) prepared as tablets, capsules, injections, ointments and other ready-to-use forms, which is intended for restoration, correction or change of physiological functions in a human or animal as well as for treatment and prevention of diseases, diagnostics, anesthesia, contraception, cosmetology, etc.

"Pharmaceutical composition" means a composition comprising the novel compound [2-(dimethylamino)-2-phenylbutyl]-3,4,5-trimethoxybenzoate 4-methyl-2H-chromen-2-on-7-yl sulphate and, at least, one of components selected from a group consisting of pharmaceutically acceptable and pharmaceutically compatible fillers, solvents, diluents, carriers, adjuvants, distributing agents, delivery vehicles, such as preservatives, stabilizers, fillers, disintegrators, moisteners, emulsifiers, suspending agents, thickeners, sweeteners, odorants, flavorants, antibacterial agents, fungicides, lubricants, regulators of prolonged delivery, which selection and ratio depend on their nature, method of introducing the composition and dosage. Examples of suspending agents are ethoxylated isostearyl alcohol, polyoxyethylene, sorbitol and sorbitol ether, microcrystalline cellulose, aluminium metahydroxide, bentonite, agar and tragacanth, as well as other pharmaceutically acceptable surfactants and mixtures thereof. Protection against microorganisms may be provided by means of various antibacterial and antifungal agents, such as, e.g., benzyl alcohol, urotropin, ethylenediaminetetraacetic acid, benzoic acid, chlorbutanol, sorbic acid, parabens, alkylpyridinium, benzethonium, their pharmaceutically acceptable salts and similar compounds. The composition may also comprise isotonic agents, e.g. sugars, sodium chloride and the like. The prolonged action of the composition may be ensured by means of agents decelerating absorption of the active medicinal agent, such as, e.g. hydrophilic polymeric release delaying agents, e.g., cellulose derivatives, polyethylene oxide, gelatin, polyvinyl alcohol, polyvinylpyrrolidon, alginates, carbomers, hydrophobic release delaying agents, such as glyceryl behenate, aluminium monostearate. Examples of suitable carriers, solvents, diluents and delivery vehicles are water, ethanol, polyalcohols, buffer solutions and mixtures thereof, vegetable oil (such as olive oil) and organic injection esters (such as ethyl oleate). Examples of fillers are lactose, milk sugar, microcrystalline cellulose, sodium citrate, calcium carbonate, calcium phosphate and the like. To regulate pH, various organic and inorganic acids may be used, such as malic, ascorbic, citric, acetic, succinic, tartaric, fumaric, lactic, aspartic, glutaric, glutamic, sorbic acids. Examples of dispersants and distributing agents are starch, alginic acid and salts thereof, silicates. Examples of lubricants are magnesium stearate, sodium lauril sulfate, talc, colloidal silicon dioxide and high-molecular polyethylene glycol. The pharmaceutical composition for oral, sublingual, transdermal, intramuscular, intravenous, subcutaneous, local, or rectal administration of the active agent, either alone or in combination with another active agent, may be administered to animals and humans in the standard administration form, in the form of a mixture with conventional pharmaceutical carriers. The suitable standard administration forms include oral forms, such as tablets, gelatin capsules, pills, powders, granules, chewing gums and oral solutions, elixirs or suspensions, sublingual and transbuccal administration forms, aerosols, implants, local, transdermal, subcutaneous, intramuscular, intravenous, intranasal or intraocular administration forms and rectal administration forms.

"Pharmaceutically acceptable salt" means relative nontoxic organic and inorganic salts of acids and bases proposed in this disclosure. These salts may be produced in situ in a process of synthesis, isolation or purification of compounds, or may be produced for a special purpose. In particular, salts of bases may be produced for a special purpose from a purified free base of the claimed compound and a suitable organic or inorganic acid. Examples of salts produced in this way are hydrochlorides, hydrobromides, sulphates, bisulphates, phosphates, nitrates, acetates, oxalates, valeriates, oleates, palmitates, stearates, laurates, borates, benzoates, lactates, tosylates, citrates, maleates, fumarates, succinates, tartrates, mesylates, malonates, salicylates, propionates, ethansulfonates, benzenesulfonates, sulphamates and the like [4]. Salts of the proposed acids may be also produced for a special purpose through a reaction of a purified acid with a suitable base, and salts of metals and amines may be synthesized. Salts of metals include salts of sodium, potassium, calcium, barium, zinc, magnesium, lithium and aluminum, optionally of them being salts of sodium and potassium. Inorganic bases suitable for producing metal salts are sodium hydroxide, carbonate, bicarbonate and hydride, potassium hydroxide and bicarbonate, potash, lithium hydroxide, calcium hydroxide, magnesium hydroxide, zinc hydroxide. As organic bases from which salts of the proposed acids may be produced, amines and amino acids are selected that have sufficient basicity for forming a stable salt and are suitable for use in medical purposes (in particular, they should have low toxicity). Such amines include ammonia, methylamine, dimethylamine, trimethylamine, ethylamine, diethylamine, triethylamine, benzylamine, dibenzylamine, dicyclohexylamine, piperazine, ethylpiperidine, tris (hydroxymethyl)aminemethane and the like. Furthermore, tetraalkylammonium hydroxides may be used for salt formation, such as, e.g., choline, tetramethylammonium, tetraethylammonium and the like. As amino acids, main amino acids, such as lysine, ornithine and arginine, may be used.

Pharmaceutical compositions may comprise pharmaceutically acceptable excipients. Pharmaceutically acceptable excipients refer to diluents, adjuvants and/or carriers used in the field of pharmacy. A pharmaceutical composition, apart from the active substance according to this disclosure or a pharmaceutically acceptable salt thereof, may also comprise other active substances, including those having activity, provided they do not cause unwanted effects.

The term "effective quantity" means a quantity of the active substance that (1) is used for treatment or prevention of a particular disease, condition or disorder, (2) alleviates, improves or eliminates one or more symptoms of a particular disease, condition or disorder, or (3) prevents or delays appearance of one or more symptoms of a particular disease, condition or disorder as described in this specification.

The term "pharmaceutically acceptable" means that a given substance or composition which is referred to by this term should be compatible, from the point of chemistry and/or toxicology, with other ingredients of a preparation and should be safe for a patient receiving this substance or composition.

The terms "comprising", "comprises" mean that respective combinations, compositions and sets include the listed components, but they do not preclude addition of other components.

DETAILED DESCRIPTION

This invention proposes the compound of Formula I, being [2-(dimethylamino)-2-phenylbutyl]-3,4,5-trimethoxybenzoate 4-methyl-2H-chromen-2-on-7-yl sulphate.

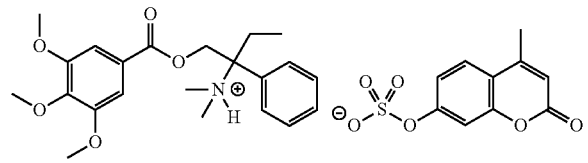

(I)

The subject of this disclosure is also a method for treating or preventing functional gastrointestinal diseases, comprising administration of an effective quantity of the compound of Formula I to a patient in need thereof.

Optionally is the method for treating or preventing functional gastrointestinal diseases, characterized in that said functional gastrointestinal diseases are functional esophageal disorders: functional esophageal chest pain, functional heartburn, reflux hypersensitivity, esophageal spasm, globus and/or functional dysphagia.

Optionally is the method for treating or preventing functional gastrointestinal diseases, wherein said functional gastrointestinal diseases are gastroduodenal disorders: functional dispepsia, postprandial distress syndrome, epigastric pain syndrome, belching disorders, aerophagia and/or excessive unspecified belching.

Optionally is the method for treating or preventing functional gastrointestinal diseases, wherein said functional gastrointestinal diseases are nausea and vomiting disorders: chronic nausea and vomiting syndrome, cyclic vomiting syndrome, cannabinoid-induced hyperemesis syndrome and/or rumination syndrome in adults.

Optionally is the method for treating or preventing functional gastrointestinal diseases, wherein said functional gastrointestinal diseases are functional bowel disorders, including those accompanied by visceral hypersensitivity: irritable bowel syndrome (IBS), including IBS with predominant constipation, IBS with predominant diarrhea, IBS with mixed bowel habits, IBS unclassified, functional constipation, functional diarrhea, functional abdominal bloating/distension, unspecified functional bowel disorder and/or opioid-induced constipation.

Optionally is the method for treating or preventing functional gastrointestinal diseases, wherein said functional gastrointestinal diseases are centrally mediated disorders of abdominal pain: centrally mediated abdominal pain syndrome and/or opioid-induced gastrointestinal hyperalgesia.

Optionally is the method for treating or preventing functional gastrointestinal diseases, wherein said functional gastrointestinal diseases are gallbladder and sphincter of Oddi disorders: biliary pain, functional gallbladder disorders, functional biliary sphincter of Oddi disorder and/or functional pancreatic sphincter of Oddi disorder.

Optionally is the method for treating or preventing functional gastrointestinal diseases, wherein said functional gastrointestinal diseases progress both independently, and at the background of cholelithiasis, cholecystitis, cholangitis, cholestatic liver diseases of various origins, non-alcoholic and alcoholic fatty liver disease (including steatohepatitis with any fibrosis stage), acute and chronic forms of pancreatitis, biliary reflux-gastritis and reflux-esophagitis and/or conditions after surgical interventions on gallbladder and biliary tracts, pancreas, including postcholecystectomy syndrome.

The subject of this disclosure is also a pharmaceutical composition for treatment and prevention of functional gastrointestinal diseases, comprising an effective quantity of the compound of Formula I and at least one pharmaceutically acceptable carrier.

Optionally is a pharmaceutical composition for treatment and prevention of functional gastrointestinal diseases, characterized in that said functional gastrointestinal diseases are functional esophageal disorders: functional esophageal chest pain, functional heartburn, reflux hypersensitivity, esophageal spasm, globus and/or functional dysphagia.

Optionally is a pharmaceutical composition for treatment and prevention of functional gastrointestinal diseases, wherein said functional gastrointestinal diseases are gastroduodenal disorders: functional dispepsia, postprandial distress syndrome, epigastric pain syndrome, belching disorders, aerophagia and/or excessive unspecified belching.

Optionally is a pharmaceutical composition for treatment and prevention of functional gastrointestinal diseases, wherein said functional gastrointestinal diseases are nausea and vomiting disorders: chronic nausea and vomiting syndrome, cyclic vomiting syndrome, cannabinoid-induced hyperemesis syndrome and/or rumination syndrome in adults.

Optionally is a pharmaceutical composition for treatment and prevention of functional gastrointestinal diseases, wherein said functional gastrointestinal diseases are functional bowel disorders, including those accompanied by visceral hypersensitivity: irritable bowel syndrome (IBS), including IBS with predominant constipation, IBS with predominant diarrhea, IBS with mixed bowel habits, IBS unclassified, functional constipation, functional diarrhea, functional abdominal bloating/distension, unspecified functional bowel disorder and/or opioid-induced constipation.

Optionally is a pharmaceutical composition for treatment and prevention of functional gastrointestinal diseases, wherein said functional gastrointestinal diseases are centrally mediated disorders of abdominal pain: centrally mediated abdominal pain syndrome and/or opioid-induced gastrointestinal hyperalgesia.

Optionally is a pharmaceutical composition for treatment and prevention of functional gastrointestinal diseases, wherein said functional gastrointestinal diseases are gallbladder and sphincter of Oddi disorders: biliary pain, functional gallbladder disorders, functional biliary sphincter of Oddi disorder and/or functional pancreatic sphincter of Oddi disorder.

Optionally is a pharmaceutical composition for treatment and prevention of functional gastrointestinal diseases, wherein said functional gastrointestinal diseases progress both independently, and at the background of cholelithiasis, cholecystitis, cholangitis, cholestatic liver diseases of various origins, non-alcoholic and alcoholic fatty liver disease (including steatohepatitis with any fibrosis stage), acute and chronic forms of pancreatitis, biliary reflux-gastritis and reflux-esophagitis and/or conditions after surgical interventions on gallbladder and biliary tracts, pancreas, including postcholecystectomy syndrome.

The subject of this disclosure is also a drug for treatment or prevention of functional gastrointestinal diseases in the form of tablets or capsules placed in a pharmaceutically acceptable package, said agent comprising an effective quantity of the compound of Formula I or a pharmaceutical composition comprising an effective quantity of the compound of Formula I and at least one pharmaceutically acceptable carrier.

Optionally is a drug for treatment or prevention of functional diseases, characterized in that said functional gastrointestinal diseases are functional esophageal disorders: functional esophageal chest pain, functional heartburn, reflux hypersensitivity, esophageal spasm, globus and/or functional dysphagia.

Optionally is a drug for treatment or prevention of functional gastrointestinal diseases, wherein said functional gastrointestinal diseases are gastroduodenal disorders: functional dispepsia, postprandial distress syndrome, epigastric pain syndrome, belching disorders, aerophagia and/or excessive unspecified belching.

Optionally is a drug for treatment or prevention of functional gastrointestinal diseases, wherein said functional gastrointestinal diseases are nausea and vomiting disorders: chronic nausea and vomiting syndrome, cyclic vomiting syndrome, cannabinoid-induced hyperemesis syndrome and/or rumination syndrome in adults.

Optionally is a drug for treatment or prevention of functional gastrointestinal diseases, wherein said functional gastrointestinal diseases are functional bowel disorders, including those accompanied by visceral hypersensitivity: irritable bowel syndrome (IBS), including IBS with predominant constipation, IBS with predominant diarrhea, IBS with mixed bowel habits, IBS unclassified, functional constipation, functional diarrhea, functional abdominal bloating/distension, unspecified functional bowel disorder and/or opioid-induced constipation.

Optionally is a drug for treatment or prevention of functional gastrointestinal diseases, wherein said functional gastrointestinal diseases are centrally mediated disorders of abdominal pain: centrally mediated abdominal pain syndrome and/or opioid-induced gastrointestinal hyperalgesia.

Optionally is a drug for treatment or prevention of functional gastrointestinal diseases, wherein said functional gastrointestinal diseases are gallbladder and sphincter of Oddi disorders: biliary pain, functional gallbladder disorders, functional biliary sphincter of Oddi disorder and/or functional pancreatic sphincter of Oddi disorder.

Optionally is a drug for treatment or prevention of functional gastrointestinal diseases, wherein said functional gastrointestinal diseases progress both independently, and at the background of cholelithiasis, cholecystitis, cholangitis, cholestatic liver diseases of various origins, non-alcoholic and alcoholic fatty liver disease (including steatohepatitis with any fibrosis stage), acute and chronic forms of pancreatitis, biliary reflux-gastritis and reflux-esophagitis and/or conditions after surgical interventions on gallbladder and biliary tracts, pancreas, including postcholecystectomy syndrome.

The subject of this disclosure is also a finished dosage form for treatment and prevention of functional gastrointestinal diseases in the form of tablets or capsules placed in a pharmaceutically acceptable package, said dosage form comprising an effective quantity of the compound of Formula I or a pharmaceutical composition comprising an effective quantity of the compound of Formula I and at least one pharmaceutically acceptable carrier.

Optionally is a finished dosage form for treatment and prevention of functional diseases, characterized in that said functional gastrointestinal diseases are functional esophageal disorders: functional esophageal chest pain, functional heartburn, reflux hypersensitivity, esophageal spasm, globus and/or functional dysphagia.

Optionally is a finished dosage form for treatment and prevention of functional gastrointestinal diseases, wherein said functional gastrointestinal diseases are gastroduodenal disorders: functional dispepsia, postprandial distress syndrome, epigastric pain syndrome, belching disorders, aerophagia and/or excessive unspecified belching.

Optionally is a finished dosage form for treatment and prevention of functional gastrointestinal diseases, wherein said functional gastrointestinal diseases are nausea and vomiting disorders: chronic nausea and vomiting syndrome, cyclic vomiting syndrome, cannabinoid-induced hyperemesis syndrome and/or rumination syndrome in adults.

Optionally is a finished dosage form for treatment and prevention of functional gastrointestinal diseases, wherein said functional gastrointestinal diseases are functional bowel disorders, including those accompanied by visceral hypersensitivity: irritable bowel syndrome (IBS), including IBS with predominant constipation, IBS with predominant diarrhea, IBS with mixed bowel habits, IBS unclassified, functional constipation, functional diarrhea, functional abdominal bloating/distension, unspecified functional bowel disorder and/or opioid-induced constipation.

Optionally is a finished dosage form for treatment and prevention of functional gastrointestinal diseases, wherein said functional gastrointestinal diseases are centrally mediated disorders of abdominal pain: centrally mediated abdominal pain syndrome and/or opioid-induced gastrointestinal hyperalgesia.

Optionally is a finished dosage form for treatment and prevention of functional gastrointestinal diseases, wherein said functional gastrointestinal diseases are gallbladder and sphincter of Oddi disorders: biliary pain, functional gallbladder disorders, functional biliary sphincter of Oddi disorder and/or functional pancreatic sphincter of Oddi disorder.

Optionally is a finished dosage form for treatment and prevention of functional gastrointestinal diseases, wherein said functional gastrointestinal diseases progress both independently, and at the background of cholelithiasis, cholecystitis, cholangitis, cholestatic liver diseases of various origins, non-alcoholic and alcoholic fatty liver disease (including steatohepatitis with any fibrosis stage), acute and chronic forms of pancreatitis, biliary reflux-gastritis and reflux-esophagitis and/or conditions after surgical interventions on gallbladder and biliary tracts, pancreas, including postcholecystectomy syndrome.

The subject of this disclosure is also use of the compound of Formula I for treatment or prevention of functional gastrointestinal diseases.

Optionally is use of the compound of Formula I for treatment or prevention of functional diseases, characterized in that said functional gastrointestinal diseases are functional esophageal disorders: functional esophageal chest pain, functional heartburn, reflux hypersensitivity, esophageal spasm, globus and/or functional dysphagia.

Optionally is use of the compound of Formula I for treatment or prevention of functional gastrointestinal diseases, wherein said functional gastrointestinal diseases are gastroduodenal disorders: functional dispepsia, postprandial distress syndrome, epigastric pain syndrome, belching disorders, aerophagia and/or excessive unspecified belching.

Optionally is use of the compound of Formula I for treatment or prevention of functional gastrointestinal diseases, wherein said functional gastrointestinal diseases are nausea and vomiting disorders: chronic nausea and vomiting syndrome, cyclic vomiting syndrome, cannabinoid-induced hyperemesis syndrome and/or rumination syndrome in adults.

Optionally is use of the compound of Formula I for treatment or prevention of functional gastrointestinal diseases, wherein said functional gastrointestinal diseases are functional bowel disorders, including those accompanied by visceral hypersensitivity: irritable bowel syndrome (IBS), including IBS with predominant constipation, IBS with predominant diarrhea, IBS with mixed bowel habits, IBS unclassified, functional constipation, functional diarrhea, functional abdominal bloating/distension, unspecified functional bowel disorder and/or opioid-induced constipation.

Optionally is use of the compound of Formula I for treatment or prevention of functional gastrointestinal diseases, wherein said functional gastrointestinal diseases are centrally mediated disorders of abdominal pain: centrally mediated abdominal pain syndrome and/or opioid-induced gastrointestinal hyperalgesia.

Optionally is use of the compound of Formula I for treatment or prevention of functional gastrointestinal diseases, wherein said functional gastrointestinal diseases are gallbladder and sphincter of Oddi disorders: biliary pain, functional gallbladder disorders, functional biliary sphincter of Oddi disorder and/or functional pancreatic sphincter of Oddi disorder.

Optionally is use of the compound of Formula I for treatment or prevention of functional gastrointestinal diseases, wherein said functional gastrointestinal diseases progress both independently, and at the background of cholelithiasis, cholecystitis, cholangitis, cholestatic liver diseases of various origins, non-alcoholic and alcoholic fatty liver disease (including steatohepatitis with any fibrosis stage), acute and chronic forms of pancreatitis, biliary reflux-gastritis and reflux-esophagitis and/or conditions after surgical interventions on gallbladder and biliary tracts, pancreas, including postcholecystectomy syndrome.

The subject of this disclosure is also use of a pharmaceutical composition comprising an effective quantity of the compound of Formula I or a finished dosage form comprising an effective quantity of the compound of Formula I for treatment or prevention of functional gastrointestinal diseases.

Optionally is use of a pharmaceutical composition comprising an effective quantity of the compound of Formula I or a finished dosage form comprising an effective quantity of the compound of Formula I for treatment or prevention of functional diseases, characterized in that said functional gastrointestinal diseases are functional esophageal disorders: functional esophageal chest pain, functional heartburn, reflux hypersensitivity, esophageal spasm, globus and/or functional dysphagia.

Optionally is use of a pharmaceutical composition comprising an effective quantity of the compound of Formula I or a finished dosage form comprising an effective quantity of the compound of Formula I for treatment or prevention of functional gastrointestinal diseases, wherein said functional gastrointestinal diseases are gastroduodenal disorders: functional dispepsia, postprandial distress syndrome, epigastric pain syndrome, belching disorders, aerophagia and/or excessive unspecified belching.

Optionally is use of a pharmaceutical composition comprising an effective quantity of the compound of Formula I or a finished dosage form comprising an effective quantity of the compound of Formula I for treatment or prevention of functional gastrointestinal diseases, wherein said functional gastrointestinal diseases are nausea and vomiting disorders: chronic nausea and vomiting syndrome, cyclic vomiting syndrome, cannabinoid-induced hyperemesis syndrome and/or rumination syndrome in adults.

Optionally is use of a pharmaceutical composition comprising an effective quantity of the compound of Formula I or a finished dosage form comprising an effective quantity of the compound of Formula I for treatment or prevention of functional gastrointestinal diseases, wherein said functional gastrointestinal diseases are functional bowel disorders, including those accompanied by visceral hypersensitivity: irritable bowel syndrome (IBS), including IBS with predominant constipation, IBS with predominant diarrhea, IBS with mixed bowel habits, IBS unclassified, functional constipation, functional diarrhea, functional abdominal bloating/distension, unspecified functional bowel disorder and/or opioid-induced constipation.

Optionally is use of a pharmaceutical composition comprising an effective quantity of the compound of Formula I or a finished dosage form comprising an effective quantity of the compound of Formula I for treatment or prevention of functional gastrointestinal diseases, wherein said functional gastrointestinal diseases are centrally mediated disorders of abdominal pain: centrally mediated abdominal pain syndrome and/or opioid-induced gastrointestinal hyperalgesia.

Optionally is use of a pharmaceutical composition comprising an effective quantity of the compound of Formula I or a finished dosage form comprising an effective quantity of the compound of Formula I for treatment or prevention of functional gastrointestinal diseases, wherein said functional gastrointestinal diseases are gallbladder and sphincter of Oddi disorders: biliary pain, functional gallbladder disorders, functional biliary sphincter of Oddi disorder and/or functional pancreatic sphincter of Oddi disorder.

Optionally is use of a pharmaceutical composition comprising an effective quantity of the compound of Formula I or a finished dosage form comprising an effective quantity of the compound of Formula I for treatment or prevention of functional gastrointestinal diseases, wherein said functional gastrointestinal diseases progress both independently, and at the background of cholelithiasis, cholecystitis, cholangitis, cholestatic liver diseases of various origins, non-alcoholic and alcoholic fatty liver disease (including steatohepatitis with any fibrosis stage), acute and chronic forms of pancreatitis, biliary reflux-gastritis and reflux-esophagitis and/or conditions after surgical interventions on gallbladder and biliary tracts, pancreas, including postcholecystectomy syndrome.

Below, exemplary embodiments of the disclosure are described which illustrate, but do not limit the disclosure.

Equipment and Chemicals

1H NMR spectra were acquired at a Bruker Avance III 400 MHz UltraShield Plus instrument. Chemical shifts (ppm) were determined relative to a solvent residual signal in 1H NMR spectra: 7.26 ppm for $CHCl_3$, 2.50 ppm for DMSO-d5.

Completeness of reactions, $R_f$ values and purity of products were controlled by the TLC method on Merck plates (silica gel 60 F254). Detection was performed with the use of an UV lamp.

Macherey-Nagel silica gel 60 (0.063-0.210 mm) was used for separation of mixtures by the column chromatography method. Melting temperatures were measured in open capillaries with the use of an oil bath and a mercury thermometer.

In order to synthesize the compound of Formula I commercially available chemicals were used: Py*$SO_3$ complex (Alfa Aesar), 7-hydroxy-4-methyl-2H-chromen-2-on (BLD Pharmatech), [2-(dimethylamino)-2-phenylbutyl]-3,4,5-trimethoxybenzoate (TCI).

Example 1. Synthesis of the Compound of Formula I

The synthesis of the compound of Formula I is a multistage process.

Sodium 4-methyl-2-oxo-2H-chromen-7-yl sulphate was produced from 7-hydroxy-4-methyl-2H-chromen-2-on [5].

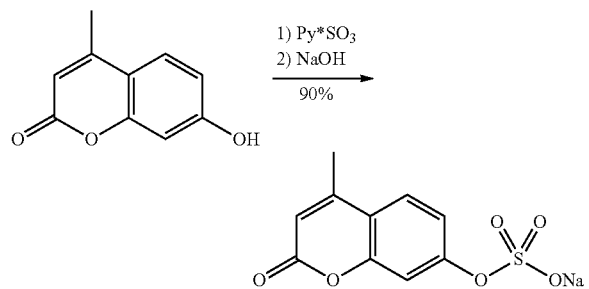

Py*$SO_3$ was added to a cumarin-in-pyridine solution, and the produced reaction mixture was held with stirring at room temperature for a day. Then, a major portion of pyridine removed from the reaction mixture in a rotor vaporizer, and the remainder was dissolved in MeOH, and a 1M NaOH-in-MeOH solution was added to the basic solution, whereupon sediment was formed. The sediment was filtered and washed with MeOH. Then, $Et_2O$ was recrystallized from the solution and dried by holding it in the air. To purify it further, the salt was ground in ice-cold water and dried at 40° C. in an oven until colorless crystals were formed. $^1$H NMR (400 MHz, DMSO-$d_6$) δ 2.41 (d, J=1.3 Hz, 3H), 6.26 (d, J=1.3 Hz, 1H), 7.16-7.20 (m, 2H) 7.69 (d, J=8.6 Hz, 1H).

This salt was subjected to ion exchange on the IR-120 ion-exchange resin preliminarily saturated with [2-(dimethylamino)-2-phenylbutyl]-3,4,5-trimethoxybenzoate for forming the protonated form of [2-(dimethylamino)-2-phenylbutyl]-3,4,5-trimethoxybenzoate on the resin surface. Since, in its structure, the resin is a styrene and divinylbenzene copolymerization product comprising aromatic sulfonate groups ($pK_a=-(2.8)$ for benzenesulfonic acid), the saturation of the [2-(dimethylamino)-2-phenylbutyl]-3,4,5-trimethoxybenzoate polymer was rather easy. The amine was applied through long-term holding of its solution in MeOH over IR-120(H) with stirring.

After saturating the ion-exchange resin with [2-(dimethylamino)-2-phenylbutyl]-3,4,5-trimethoxybenzoate, an alcohol solution of sodium salt of sulfuric acid monoester (the MeOH solvent) flew through it.

After the ion exchange, the reaction mixture was grounded in water. The formed water-insoluble remainder was dried at 35° C. and cooled to room temperature, and a colorless mass was formed that was easily ground with a spatula to a colorless crystalline sediment. The sediment spectrum was solely a set of signals of an anion of sulfuric acid ester and [2-(dimethylamino)-2-phenylbutyl]-3,4,5-trimethoxybenzoate in its protonated form. $^1$H NMR (400 MHz, DMSO-$d_6$) δ 0.75 (t, J=7.2 Hz, 3H), 2.23-2.47 (m, 5H), 2.67 (br, 3H), 2.85 (br, 3H), 3.75 (s, 3H), 3.82 (s, 6H), 4.89 (d, J=13.5 Hz, 1H), 5.25 (d, J=13.5 Hz, 1H), 6.24 (s, 1H), 7.16-7.23 (m, 4H), 7.49-7.60 (m, 3H), 7.62-7.70 (m, 3H), 9.63 (br, 1H).

The below examples show pharmacological activity of the novel compound of Formula I.

Table 1 shows the study groups formed by quantities of the introduced active component and placebo.

The indicated dosages are recalculated for a human.

TABLE 1

Study groups and dosage of an active component.

| Group No. | Dosage of the compound of Formula I, mg |
|---|---|
| 1 (placebo)* | 0 |
| 2 | 10 |
| 3 | 300 |
| 4 | 1,800 |

*a starch solution was used as placebo.

Example 2. Study of Influence of the Compound of Formula I in a Visceral Pain Sensing Model In the experiments, 13-week old male mice of the C57 BL/6 line were used. Sixty (60) animals were randomly distributed into four (4) groups of equal number (N=15) characterized by the dosage of the administered compound.

The study was conducted for three different doses of the compound of Formula I. A group of mice receiving only the carrier (starch solution) served as the control group (placebo group).

Colitis was induced by introducing 0.1 mL of TNBS (trinitrobenzene sulfonate) (130 μg/mL in 30% EtOH) into the large intestine through a polyethylene catheter introduced by 3 cm into the anus of mice anesthetized with isoflurane. Then, the mice were arranged individually, and changes in the body weight, appearance and behavior were observed daily. A histological study of the mucosa structure, cell infiltrate, intestinal crypt abscesses and goblet cells confirmed significant damage caused by the TNBS introduction on Day 3 and, in a significant degree, on Day 7 [6].

The preparations were introduced orally in three days after the TNBS introduction and then once daily for the whole study period.

To assess pain behavior, the von Frey test with filaments (appearance of mechanical allodynia) on Day 28 after the TNBS introduction.

The animals were put into an acrylic chamber (15×15×15 cm) raised above the ground with a wire mesh on the bottom. Before starting the tests, the animals were left in the chamber for 5-10 minutes for adaptation. Then, the abdominal cavity of the animal was stimulated with von Frey calibrated filaments (or fibers) (BIOSEB, USA). The filaments were a set of 10 standard plastic fibers of increasing diameters. The fiber rigidity, which is expressed as a minimal force required to flex a fiber, was increased in such calibration logarithmically, with absolute values from 0.6 g to 26 g. Sensitivity threshold of each mouse was determined in three repeats (6 touches in total with 10-second interval for each filament; the interval between successive touches with different filaments was 2 minutes). The abdominal surface was poked with a force required to flex the fiber, and the fiber was held in that position for 6-8 seconds. The positive response was recorded, if the animal sharply winced during touching. A sensitivity threshold was determined by a minimal pressure causing the wincing reflex reaction (4 times of 6 touches).

An average score received in a corresponding test and a standard error of the mean for each value were calculated for each study group (n=15).

TABLE 2

Influence of the compound of Formula I on mice behavior in the test of visceral pain induced by colitis.

| Preparation | Dose, mg/day | Group No. | Mechanical allodynia intensity, g (mean ± standard error of the mean) |
|---|---|---|---|
| Placebo | — | 1 | 2.0 ± 0.5 |
| Compound of Formula I | 10 | 2 | 10.0 ± 0.5* |
|  | 300 | 3 | 21.4 ± 0.9* |
|  | 1,800 | 4 | 23.1 ± 1.0* |

*reliable difference of the effect of the compound of Formula I (significance level $p < 0.05$) from placebo.

Indices of mechanical allodynia were significantly lower in the groups receiving the compound of Formula I, which evidences effective use of the inventive compound for treatment of chronic pain in the abdominal cavity.

Literature
1. Nagasaki, M.; Komori, S.; Ohashi, H. Effect of trimebutine on voltage-activated calcium current in rabbit ileal smooth muscle cells. Br. J. Pharmacol. 1993, 110, 399.
2. Intl. Application WO 2013/134869 A1.
3. Fukuda, T.; Ohta, T.; Saeki, S.; Iwao, M. Divergent synthesis of lamellarin α 13-sulfate, 20-sulfate, and 13,20-disulfate. Heterocycles 2010, 80, 841.
4. Berge S. M., Bighley L. D., Monkhouse D. C.: "Pharmaceutical Salts" // Journal of Pharmaceutical Sciences, V. 66, # 1, 1977, pp. 1-19.
5. U.S. Pat. No. 6,921,776 B1.
6. de Araujo A D et al. Selenoether oxytocin analogues have analgesic properties in a mouse model of chronic abdominal pain // Nature Communications, 2014, 5, 3165.
7. Hiroshi et al. Biliary spasmolytic action of 3-(2,4,5-trieyjoxybenzoyl)propionic acid (aa-149) in dogs, Europ. J. of Pharm., 1978, v.48, pp.:309-317;
8. Satoh H. et al., Relaxing action of trepibutone (AA-149), Japan. J. Pharmacol., 1981, v.31, pp. 587-592.

The invention claimed is:

1. A compound of Formula I being [2-(dimethylamino)-2-phenylbutyl]-3,4,5-trimethoxybenzoate 4-methyl-2H-chromen-2-on-7-yl sulphate

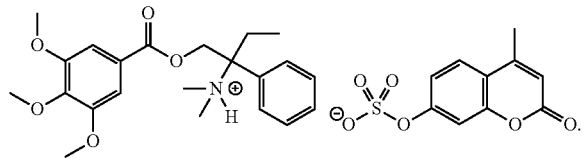

2. A pharmaceutical composition for treatment of functional gastrointestinal diseases, comprising an effective quantity of the compound of claim 1 and at least one pharmaceutically acceptable carrier.

3. The pharmaceutical composition of claim 2, wherein the functional gastrointestinal diseases are functional esophageal disorders, gastroduodenal disorders, functional bowel disorders, irritable bowel syndrome (IBS), centrally mediated disorders of abdominal pain.

4. The pharmaceutical composition of claim 2, wherein the functional gastrointestinal diseases are functional esophageal chest pain, functional heartburn, reflux hypersensitivity, esophageal spasm, globus and/or functional dysphagia, functional dispepsia, postprandial distress syndrome, epigastric pain syndrome, belching disorders, aerophagia and/or excessive unspecified belching, chronic nausea vomiting syndrome, cyclic vomiting syndrome, cannabinoid-induced hyperemesis syndrome and/or rumination syndrome in adults, functional bowel disorders, including those accompanied by visceral hypersensitivity, irritable bowel syndrome (IBS), including IBS with predominant constipation, IBS with predominant diarrhea, IBS with mixed bowel habits, IBS unclassified, functional constipation, functional diarrhea, functional abdominal bloating/distension, unspecified functional bowel disorder and/or opioid-induced constipation, biliary pain, functional gallbladder disorders, functional biliary sphincter of Oddi disorder and/or functional pancreatic sphincter of Oddi disorder.

5. A drug for treatment of functional gastrointestinal diseases in the form of tablets or capsules placed in a pharmaceutically acceptable package, said agent comprising an effective quantity of the compound of claim 1.

6. The drug of claim 5, wherein the functional gastrointestinal diseases are functional esophageal disorders, gastroduodenal disorders, functional bowel disorders, irritable bowel syndrome (IBS), centrally mediated disorders of abdominal pain.

7. The drug of claim 5, wherein the functional gastrointestinal diseases are functional esophageal chest pain, functional heartburn, reflux hypersensitivity, esophageal spasm, globus and/or functional dysphagia, functional dispepsia, postprandial distress syndrome, epigastric pain syndrome, belching disorders, aerophagia and/or excessive unspecified belching, chronic nausea vomiting syndrome, cyclic vomiting syndrome, cannabinoid-induced hyperemesis syndrome and/or rumination syndrome in adults, functional bowel disorders, including those accompanied by visceral hypersensitivity, irritable bowel syndrome (IBS), including IBS with predominant constipation, IBS with predominant diarrhea, IBS with mixed bowel habits, IBS unclassified, functional constipation, functional diarrhea, functional abdominal bloating/distension, unspecified functional bowel disorder and/or opioid-induced constipation, biliary pain, functional gallbladder disorders, functional biliary sphincter of Oddi disorder and/or functional pancreatic sphincter of Oddi disorder.

8. A finished dosage form for treatment of functional gastrointestinal diseases in the form of tablets or capsules placed in a pharmaceutically acceptable package, said dosage form comprising an effective quantity of the compound of claim 1.

9. The finished dosage form of claim 8, wherein the functional gastrointestinal diseases are functional esophageal disorders, gastroduodenal disorders, functional bowel disorders, irritable bowel syndrome (IBS), centrally mediated disorders of abdominal pain.

10. The finished dosage form of claim 8, wherein the functional gastrointestinal diseases are functional esophageal chest pain, functional heartburn, reflux hypersensitivity, esophageal spasm, globus and/or functional dysphagia, functional dispepsia, postprandial distress syndrome, epigastric pain syndrome, belching disorders, aerophagia and/or excessive unspecified belching, chronic nausea vomiting syndrome, cyclic vomiting syndrome, cannabinoid-induced hyperemesis syndrome and/or rumination syndrome in adults, functional bowel disorders, including those accompanied by visceral hypersensitivity, irritable bowel syndrome (IBS), including IBS with predominant constipation, IBS with predominant diarrhea, IBS with mixed bowel habits, IBS unclassified, functional constipation, functional diarrhea, functional abdominal bloating/distension, unspecified functional bowel disorder and/or opioid-induced constipation, biliary pain, functional gallbladder disorders, functional biliary sphincter of Oddi disorder and/or functional pancreatic sphincter of Oddi disorder.

11. A drug for treatment of functional gastrointestinal diseases in the form of tablets or capsules placed in a pharmaceutically acceptable package, said agent comprising an effective quantity of the pharmaceutical composition of claim 2.

12. The drug of claim 11, wherein the functional gastrointestinal diseases are functional esophageal disorders, gastroduodenal disorders, functional bowel disorders, irritable bowel syndrome (IBS), centrally mediated disorders of abdominal pain.

13. The drug of claim 11, wherein the functional gastrointestinal diseases are functional esophageal chest pain, functional heartburn, reflux hypersensitivity, esophageal spasm, globus and/or functional dysphagia, functional dispepsia, postprandial distress syndrome, epigastric pain syndrome, belching disorders, aerophagia and/or excessive unspecified belching, chronic nausea vomiting syndrome, cyclic vomiting syndrome, cannabinoid-induced hyperemesis syndrome and/or rumination syndrome in adults, functional bowel disorders, including those accompanied by visceral hypersensitivity, irritable bowel syndrome (IBS), including IBS with predominant constipation, IBS with predominant diarrhea, IBS with mixed bowel habits, IBS unclassified, functional constipation, functional diarrhea, functional abdominal bloating/distension, unspecified functional bowel disorder and/or opioid-induced constipation, biliary pain, functional gallbladder disorders, functional biliary sphincter of Oddi disorder and/or functional pancreatic sphincter of Oddi disorder.

14. A finished dosage form for treatment of functional gastrointestinal diseases in the form of tablets or capsules placed in a pharmaceutically acceptable package, said dosage form comprising an effective quantity of the pharmaceutical composition of claim 2.

15. The finished dosage form of claim 14, wherein the functional gastrointestinal diseases are functional esophageal disorders, gastroduodenal disorders, functional bowel disorders, irritable bowel syndrome (IBS), centrally mediated disorders of abdominal pain.

16. The finished dosage form of claim 14, wherein the functional gastrointestinal diseases are functional esophageal chest pain, functional heartburn, reflux hypersensitivity, esophageal spasm, globus and/or functional dysphagia, functional dispepsia, postprandial distress syndrome, epigastric pain syndrome, belching disorders, aerophagia and/or excessive unspecified belching, chronic nausea vomiting syndrome, cyclic vomiting syndrome, cannabinoid-induced hyperemesis syndrome and/or rumination syndrome in adults, functional bowel disorders, including those accompanied by visceral hypersensitivity, irritable bowel syndrome (IBS), including IBS with predominant constipation, IBS with predominant diarrhea, IBS with mixed bowel habits, IBS unclassified, functional constipation, functional diarrhea, functional abdominal bloating/distension, unspecified functional bowel disorder and/or opioid-induced constipation, biliary pain, functional gallbladder disorders, functional biliary sphincter of Oddi disorder and/or functional pancreatic sphincter of Oddi disorder.

* * * * *